United States Patent
DeJong

(10) Patent No.: US 11,304,391 B1
(45) Date of Patent: Apr. 19, 2022

(54) MICROGREENS GROWER

(71) Applicant: New England Arbors Canada, Inc., Sarnia (CA)

(72) Inventor: Eddie James DeJong, Sarnia (CA)

(73) Assignee: NEW ENGLAND ARBORS CANADA, INC., Sarnia (CA)

( * ) Notice: Subject to any disclaimer, the term of this patent is extended or adjusted under 35 U.S.C. 154(b) by 0 days.

(21) Appl. No.: 17/339,355

(22) Filed: Jun. 4, 2021

Related U.S. Application Data

(60) Provisional application No. 63/146,022, filed on Feb. 5, 2021.

(51) Int. Cl.
- *A01G 31/00* (2018.01)
- *A01G 31/06* (2006.01)
- *A01G 7/04* (2006.01)

(52) U.S. Cl.
CPC ............ *A01G 31/06* (2013.01); *A01G 7/045* (2013.01)

(58) Field of Classification Search
CPC .......... A01G 31/06; A01G 7/045; A01G 7/02; A01G 7/04; A01G 9/14; A01G 9/18; A01G 9/20; A01G 9/24; A01G 9/241; A01G 9/246; A01G 9/247
See application file for complete search history.

(56) References Cited

U.S. PATENT DOCUMENTS

| | | | |
|---|---|---|---|
| 7,356,964 B2 | 4/2008 | Ahm | |
| 2009/0019765 A1 | 1/2009 | Kosinski et al. | |
| 2010/0115834 A1* | 5/2010 | Miyahara | A01G 9/16 47/65.5 |
| 2014/0318012 A1* | 10/2014 | Fujiyama | A01G 9/02 47/62 R |
| 2016/0212954 A1* | 7/2016 | Argento | A01G 31/02 |
| 2017/0094920 A1* | 4/2017 | Ellins | A01G 31/02 |
| 2017/0223912 A1* | 8/2017 | Gagne | A01G 25/16 |
| 2018/0077884 A1* | 3/2018 | Barker | A01G 9/085 |
| 2018/0359957 A1* | 12/2018 | Millar | G05B 23/0272 |
| 2019/0045731 A1 | 2/2019 | Dixon et al. | |
| 2019/0335691 A1* | 11/2019 | Krakover | A01G 31/06 |
| 2020/0375127 A1* | 12/2020 | Thoma | A01G 9/247 |
| 2020/0390045 A1 | 12/2020 | Harrison | |
| 2020/0396917 A1* | 12/2020 | Olesen | A01G 27/001 |

FOREIGN PATENT DOCUMENTS

| | | |
|---|---|---|
| CN | 108651075 | 10/2018 |
| CN | 209171014 | 7/2019 |
| CN | 209345657 | 9/2019 |
| CN | 210808449 | 6/2020 |
| WO | 201734383 | 3/2017 |
| WO | 2018202405 | 11/2018 |
| WO | 2020051681 | 3/2020 |

* cited by examiner

*Primary Examiner* — Trinh T Nguyen
(74) *Attorney, Agent, or Firm* — Trego, Hines & Ladenheim, PLLC

(57) ABSTRACT

A microgreens grower includes: a chamber; a seed support disposed above the chamber, the seed support having a structure which is configured to prevent seeds of a predetermined size from falling through, but is permeable to water; a mist generator disposed below the seed support and in communication with a water reservoir; at least one grow light disposed above the seed support; and an electronic controller operable to selectively provide electrical power to the mist generator and the at least one grow light.

16 Claims, 3 Drawing Sheets

MICROGREENS GROWER

BACKGROUND OF THE INVENTION

This invention relates generally to growing microgreens and more particularly to an automated device for growing microgreens.

There is an interest in the cultivation of microgreens. One definition of microgreens is a very small, young, and tender edible leaf. Numerous plants may be cultivated and harvested at an early stage of maturity to produce edible or otherwise usable microgreens.

Examples of plants used for Microgreens include but are not limited to: alfalfa, amaranth, arugula, beetroot (beets), broccoli, Brussels sprouts, buckwheat, cabbage, carrot, chia, clover, collards, fenugreek, green peas, green radish, kale, kohlrabi, lettuce, mustard, and sesame.

BRIEF SUMMARY OF THE INVENTION

Aspects of the present invention provide an apparatus and method for automated cultivation of microgreens.

According to one aspect of the technology described herein, A microgreens grower includes: a chamber; a seed support disposed above the chamber, the seed support having a structure which is configured to prevent seeds of a predetermined size from falling through, but is permeable to water; a mist generator disposed below the seed support and in communication with a water reservoir; at least one grow light disposed above the seed support; and an electronic controller operable to selectively provide electrical power to the mist generator and the at least one grow light.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
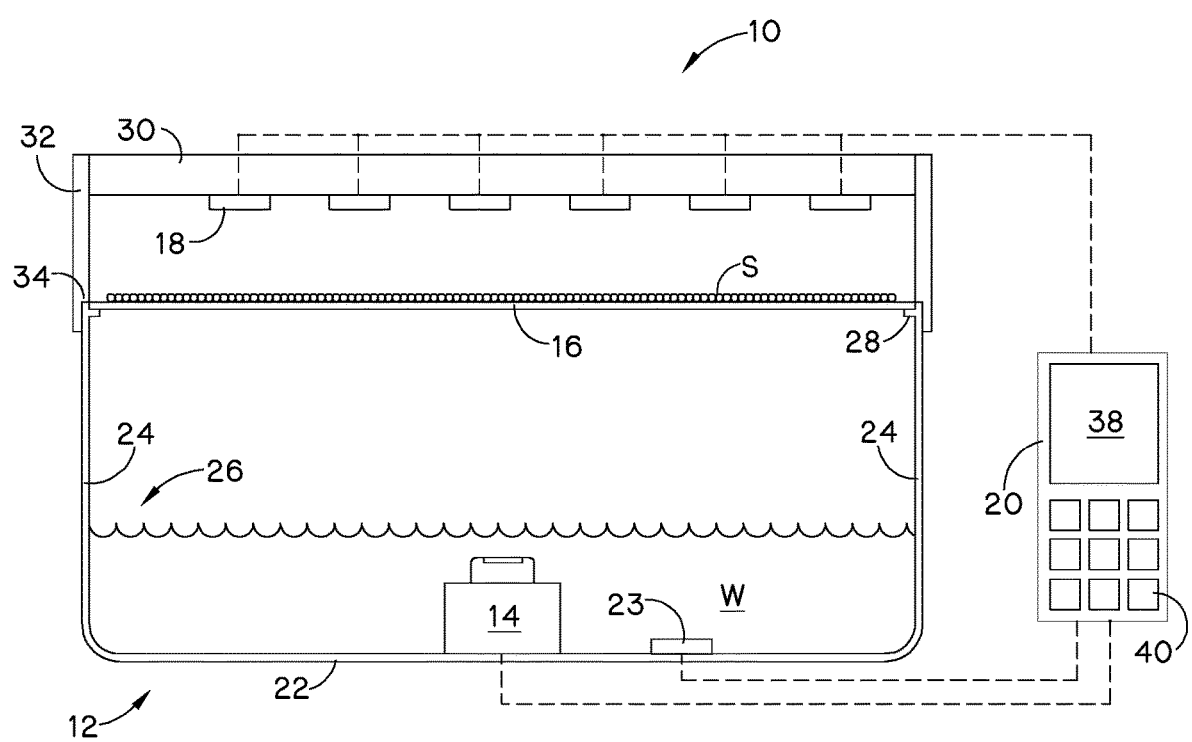
FIG. 1 is a schematic, sectional view of a first embodiment of a microgreens grower constructed in accordance with an aspect of the present invention.

Referring to the drawings wherein identical reference numerals denote the same elements throughout the various views, FIG. 1 depicts a first exemplary embodiment of a microgreens grower 10. The basic components of the grower 10 include a chamber 12, a mist generator 14, a seed support 16, grow lights 18, and a controller 20.

In the embodiment of FIG. 1, the chamber 12 comprises an open-top container with a floor 22 and sidewalls 24. The bottom portion of the chamber 12 functions as an integral water reservoir 26 which is suitable for holding a quantity of water "W". Optionally, the water reservoir 26 may be provided with sanitizing device 23 effective to reduce the population of microbes in the water W. In one example, the sanitizing device 23 is a lamp emitting light in the ultraviolet ("UV") spectrum (approximate wavelength 100 nm-400 nm). UV light has antimicrobial properties. In the illustrated example, the sanitizing device 23 is shown as being submerged, but could be placed anywhere in the chamber 12 where there is a line of sight to the water reservoir 26.

The seed support 16 spans across the chamber 12. In the illustrated example, the seed support 16 rests on a ledge 28 integrally formed on the sidewalls 24 of the chamber 12.

In use, plant seeds "S" are placed on top of the seed support 16. The seed support 16 has a structure with openings selected to prevent seeds S of a predetermined size from falling through, but is permeable to water in liquid and/or vapor form. In one example, the openings in the seed support 16 may have a size of approximately 0.9 mm. This generally would be small enough to prevent any commonly-grown seed from falling through. The seed support 16 may comprise a structure such as a perforated plate, grid, or mesh. In one example, a stainless steel mesh or other corrosion-proof material may be used.

A benefit of the seed support 16 is that microgreens can be easily harvested when ready by scraping them off the seed to support 16 using a plastic spatula or similar tool. The seed support 16 can be removed after use and easily cleaned, for example in a dishwasher.

Optionally, a mat of fibrous material (not shown) such as hemp or coconut may be used on top of the seed support 16 and used as a growth medium. This would allow the user to remove the mat and plant it in a garden. This permits the grower 10 to be used as a seed starter as well as a microgreens grower.

The mist generator 14 is disposed below the seed support 16. The mist generator 14 may be any device effective to generate either a mist of water droplets, water vapor, or a combination of the two. Nonlimiting examples of commercially-available mist generators include heat vaporizing devices, pressurized spray nozzles, mechanical misters, or ultrasonic mist generators. The mist generator 14 is in flow communication with the water reservoir 26. In the illustrated example, the mist generator 14 is shown as an electrically-powered ultrasonic mist generator which is submerged in water W contained in the water reservoir 26.

It will be understood that appropriate functional connections would be provided for the mist generator 14, such as electrical power, control signals, and air and/or water inlet or outlet connections.

The mist generator 14, the water reservoir 26, and the seed support 16 are arranged such that collectively they define a path for mist from the mist generator 14 to travel through the seed support 16 and contact seeds S.

The grow lights 18 may be any device which emits light in wavelengths and intensity suitable to support plant growth. Nonlimiting examples of suitable devices include incandescent lamps, florescent lamps, or light emitting diodes (LEDs). Nonlimiting examples of light colors suitable to support plant growth include blue lights (approximate wavelength range 400 nm-500 nm), red lights (approximate wavelength range 620 nm-750 nm), and combinations of red and blue lights. In one specific example, the grow lights 18 may emit light at 450 nm and 660 nm. In the illustrated example, a plurality of grow lights 18 are arrayed above the seed support 16. Optionally, one or more of the grow lights 18, in addition to or as an alternative to emitting light colors suitable to support plant growth, may be configured to emit light in the ultraviolet ("UV") spectrum as described for the sanitizing device described above. This would having the effect of sanitizing any potential bacteria in the circulated water. Stated another way, the grow lights 18 could function as a "sanitizing device". One example of a suitable device for this purpose is a UVLED type bulb.

In this example, a light support 30 is suspended above the seed support 16 by legs 32 which sit on the rim 34 of the chamber 12.

Means are provided for selectively providing electrical power to the mist generator 14 and the grow lights 18. In the illustrated example, the electronic controller 20 includes a suitable power source such as a battery or mains electrical connection, switching elements such as relays or transistors, and some means for executing programmed routines. For example, the controller 20 may include an electromechanical timer, discrete electronic components, a programmable logic controller ("PLC"), and/or a microprocessor. Suitable user controls are also provided such as switches and/or display elements. In this example, the controller includes a display 38 such as an LCD or LED screen, and controls 40 such as buttons or touch pads.

The controller 20 may be pre-programmed with a grow cycle. For example, in response to user input such as pressing a start button, the controller 20 may activate the mist generator 14 for a predetermined number of hours per day for a predetermined number of days. Subsequently, the controller 20 may activate the grow lights 18 to turn on during certain times of the day for an additional number of days. When the cycle is complete, the controller 20 may deactivate the mist generator 14 and the grow lights 18 and provide some indication that the cycle is done, such as eliminating a light for producing a text or audio report using the display 38.

The grower 10 is used by first ensuring that the water reservoir 26 is filled with an appropriate quantity of water W. The seed support 16 is placed in position. Seeds S are placed onto the seed to support 16. The grow lights 18 are then placed in position over the seed support 16. The grower 10 is placed in a relatively dark place.

Next, the grow cycle is started by triggering the controller 20, for example by pressing a "start" button. The controller 20 may be pre-programmed with different grow cycles for different species of plants. If that is the case, the user would begin by using the controls 40 to select the appropriate grow cycle and then activating the start control. If the optional sanitizing device 23 is used, the controller 20 may begin a cycle by operating the sanitizing device 23 for predetermined amount of time, to reduce or eliminate microbial growth in the water W. Alternatively, the sanitizing device may be used at different times within the grow cycle.

Initially, the controller 20 would power the mist generator 14 without activating the grow lights 18. The grow cycle may have a first phase of a predetermined duration (e.g. three days) calling for mist generator operation for a predetermined number of hours per day (e.g., eight hours per day).

Subsequently, the controller 20 would continue to power the mist generator 14 and also activate the grow lights 18. The grow cycle may have a second phase of a predetermined duration (e.g. three days) calling for mist generator operation for a predetermined number of hours per day (e.g., eight hours per day) and also calling for the grow lights 18 to turn on during certain times of the day.

The duration of mist generator operation per day, the time of day and duration of grow light operation, and the duration of each phase may be determined with knowledge of a particular plant species such that, at the end of a complete cycle, the seeds S will have produced plant growth to the microgreens stage of development. Instead of the two-stage example described above, the complete grow cycle may be divided into three or more phases with different amounts of mist generator operation and grow light operation.

When the grow cycle is complete, the controller 20 may deactivate the mist generator 14 and the grow lights 18 and provide some visual or audible indication or notification that the cycle is done, such as illuminating a light or producing a text or audio report using the display 38.

The user may then harvest the microgreens by simply scraping them from the seed support 16. The seed support 16 may be removed, cleaned, and replaced ready for use in an new grow cycle.

In an alternative usage, once the grower 10 is prepared, a mat of fibrous material (not shown) such as hemp or coconut may be used on top of the seed support 16 and used as a growth medium for seeds S. The grow cycle as described above may then be activated. When the grow cycle is complete, the user may remove the mat and plant it in a container filled with soil or in a garden.

Different physical configurations of the grower 10 are possible which function in the same manner.

Figure 2:
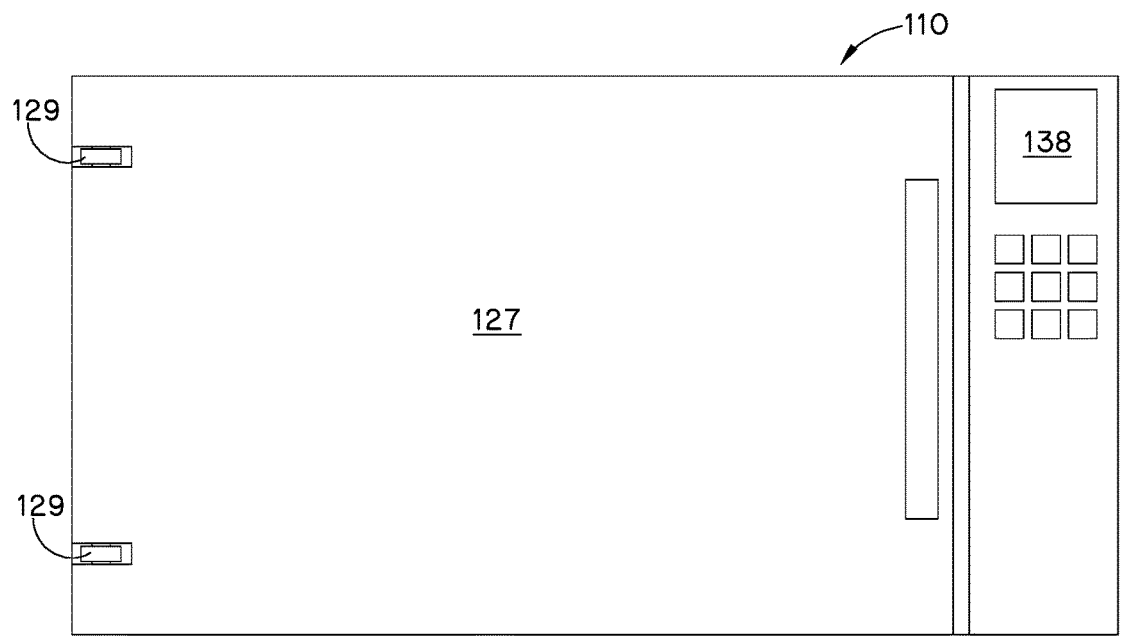
FIG. 2 is a schematic side view of a second embodiment of a microgreens grower constructed in accordance with an aspect of the present invention.
Figure 3:
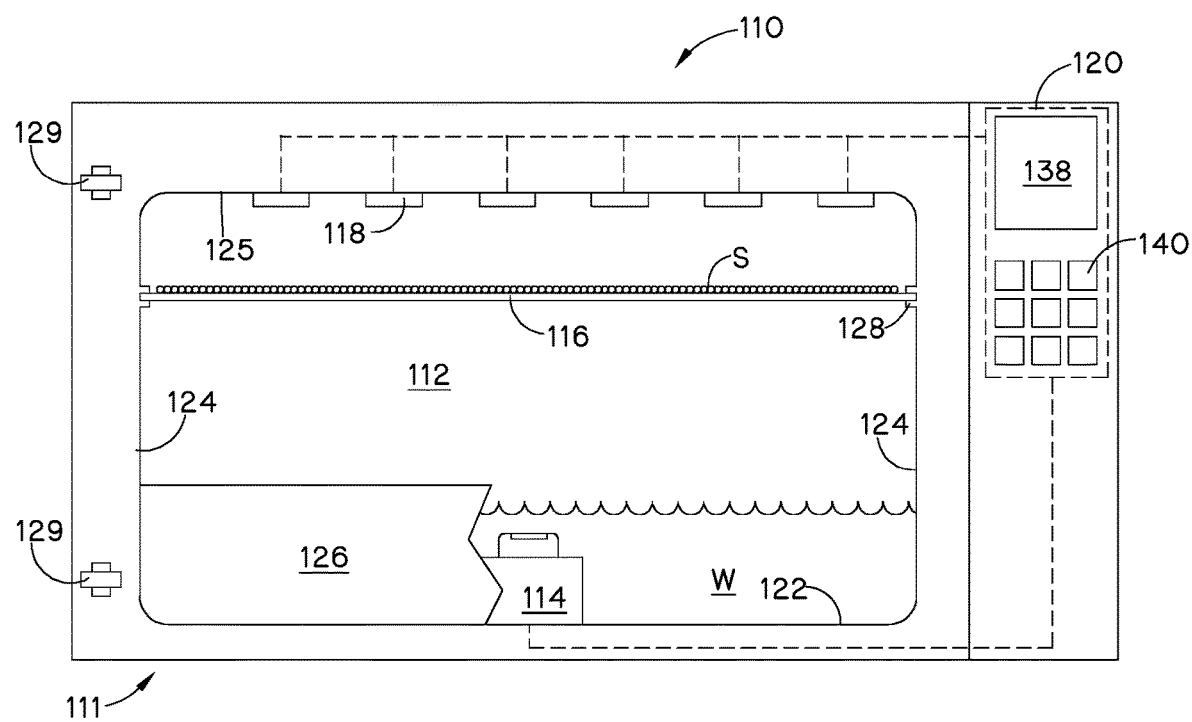
FIG. 3 is a schematic, partially cut away side view of the grower of FIG. 2, with a door removed to show the interior of the apparatus.

FIGS. 2 and 3 illustrate an alternative embodiment of a grower 110. The grower 110 is similar in construction to the grower 10 described above. Elements of the grower 110 not explicitly described may be taken to be identical to those of the grower 10. The basic components of the grower 110 include a structural housing 111 including an integral chamber 112, a mist generator 114, a seed support 116, grow lights 118, and a controller 120.

The housing 111 may be any convenient size and shape. In the illustrated example it is generally rectangular solid which may be accommodated on a table or countertop. The chamber 112 is formed within the housing 111 and includes a floor 122, sidewalls 124, and a ceiling 125. The front of the chamber 112 may be selectively exposed or closed off by a door 127 pivotally mounted to the housing 111 by hinges 129. The bottom portion of the chamber 112 receives an open-topped water reservoir 126 which is suitable for holding a quantity of water "W". The water reservoir 126 may optionally be integrally formed as part of the chamber 112. Optionally, the water reservoir 126 may include a sanitizing device as described above (not shown).

The seed support 116 is disposed in the chamber 112 and rests in slots 128 integrally formed on the sidewalls 124. It can be easily removed by simply pulling it out of the slots 128.

The mist generator 114 is disposed below the seed support 116.

The grow lights 118 are arrayed on the ceiling 125, above the seed support 116.

The controller 120 is integrated into the housing 111. It includes means for selectively providing electrical power to the mist generator 114 and the grow lights 118. In this example, the controller includes a display 138 such as an LCD or LED screen, and controls 140 such as buttons or touch pads.

The grower 110 is prepared for use by opening the door 127, filling the water reservoir 126 with water W, inserting the seed support 116, placing seeds S on the seed support 116, and closing the door 127. Operation of the grower 110 for the grow cycle is otherwise the same as for grower 10 described above.

Figure 4:
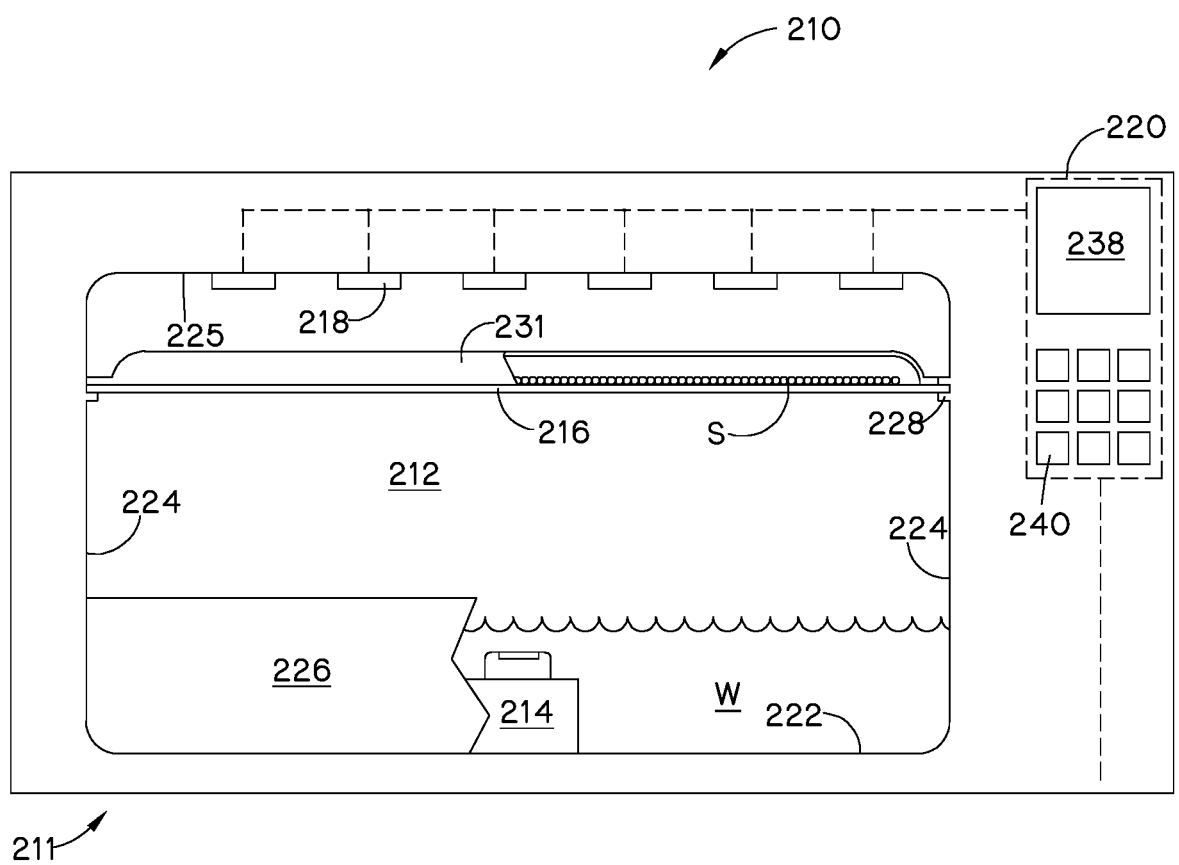
FIG. 4 is a schematic, partially cut away side view of a third embodiment of a microgreens grower constructed in accordance with an aspect of the present invention.

FIG. 4 depicts another exemplary embodiment of a microgreens grower 210. The basic components of the grower 210 include a structural housing 211 including an integral chamber 212, a mist generator 214, a seed support 216, grow lights 218, and a controller 220.

The housing 211 may be any convenient size and shape. In the illustrated example it is generally rectangular solid which may be accommodated on a table or countertop the chamber 212 is formed within the housing 211 and includes a floor 222, sidewalls 224, and a ceiling 225. The bottom portion of the chamber 212 receives an open-topped water reservoir 226 which is suitable for holding a quantity of water "W". The water reservoir 226 may optionally be integrally formed as part of the chamber 212. Optionally, the water reservoir 226 may include a sanitizing device of the type described above (not shown).

The seed support 216 is disposed in the chamber 212 and rests in slots 228 integrally formed on the sidewalls 224. It can be easily removed by simply pulling it out of the slots 228. The seed support 216 is provided with a removable cover 231 which is translucent or transparent to permit light from the grow light to reach the seeds underneath.

The mist generator 214 is disposed below the seed support 216.

The grow lights 218 are arrayed on the ceiling 225, above the seed support 216.

The controller 220 is integrated into the housing 211. It includes means for selectively providing electrical power to the mist generator 214 and the grow lights 218. In this example, the controller includes a display 238 such as an LCD or LED screen, and controls 240 such as buttons or touch pads.

The grower 210 is prepared for use by filling the water reservoir 226 with water W. The seed support 216 is prepared by placing seeds S on the seed support 216 and the placing the cover 231 into position. The seed support 216 with cover 231 is then slid into position in the chamber 212. Operation of the grower 210 for the grow cycle is otherwise the same as for grower 10 described above.

The foregoing has described a microgreens grower and method for its use. All of the features disclosed in this specification, and/or all of the steps of any method or process so disclosed, may be combined in any combination, except combinations where at least some of such features and/or steps are mutually exclusive.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends, or to any novel one, or any novel combination, of the steps of any method or process so disclosed.

What is claimed is:

1. A microgreens grower, comprising:
a chamber;
a seed support disposed above the chamber, the seed support having a structure which is configured to prevent seeds of a predetermined size from falling through, but is permeable to water;
a mist generator disposed below the seed support and in communication with a water reservoir;
at least one grow light disposed above the seed support; and
an electronic controller operable to selectively provide electrical power to the mist generator and the at least one grow light, wherein the electronic controller is programmed to carry out a selected grow cycle in response to user activation, the grow cycle comprising:
in a first phase having a first predetermined duration, powering the mist generator without activating the at least one grow light, for a predetermined number of hours per day; and
In a second phase having a second predetermined duration, powering the mist generator for a predetermined number of hours per day; and turning on the at least one grow light during predetermined times of the day, wherein the second phase occurs subsequent to the first phase.

2. The microgreens grower of claim 1, wherein the selected grow cycle is one of a plurality of pre-programmed grow cycles, each grow cycle including predetermined hours of mist generator operation per day, time of day, and duration of grow light operation, and duration of each phase determined with knowledge of a selected plant species such that, at the end of a complete cycle, the seeds will have produced plant growth to the microgreens stage of development.

3. The microgreens grower of claim 1, wherein the complete grow cycle includes three or more phases, each phase including different amounts of mist generator operation and grow light operation.

4. The microgreens grower of claim 1, wherein the controller is programmed to provide a visual or audible notification that the grow cycle is complete.

5. The microgreens grower of claim 1, wherein the electronic controller is programmed to operate a sanitizing device to emit light in the ultraviolet spectrum for a predetermined amount of time, to reduce or eliminate microbial growth in the water.

6. The microgreens grower of claim 1, wherein:
the chamber comprises an open-top container with a floor and sidewalls; and
the bottom portion of the chamber incorporates an integral water reservoir.

7. The microgreens grower of claim 1, wherein: the seed support spans across the chamber and rests on a ledge integrally formed on sidewalls of the chamber.

8. The microgreens grower of claim 1, wherein the seed support comprises a stainless steel mesh.

9. The microgreens grower of claim 1, wherein the at least one grow light is mounted to a light support suspended above the seed support by legs which sit on a rim of the chamber.

10. The microgreens grower of claim 1, wherein a structural housing includes the chamber as an integral part, and encloses the mist generator, the seed support, grow lights, and an electronic controller operable to selectively provide electrical power to the mist generator and the at least one grow light.

11. The microgreens grower of claim 10 wherein:
the chamber includes a floor, sidewalls, and a ceiling; and
a door is pivotally mounted to the housing, the door being moveable to selectively expose or closed off the front of the chamber.

12. The microgreens grower of claim 10, wherein an open-topped water reservoir is disposed in a bottom portion of the chamber.

13. The microgreens grower of claim 10, wherein the water reservoir is integrally formed as part of the chamber.

14. The microgreens grower of claim 10, wherein the water reservoir includes a sanitizing device operable to emit light in the ultraviolet spectrum.

15. The microgreens grower of claim 10, wherein the seed support is disposed in the chamber and rests in slots integrally formed on sidewalls of the chamber.

16. The microgreens grower of claim 10, wherein the seed support includes a removable translucent or transparent cover.

\* \* \* \* \*